(12) United States Patent
Dinc et al.

(10) Patent No.: US 12,476,781 B2
(45) Date of Patent: Nov. 18, 2025

(54) TIMING CALIBRATION TECHNIQUES FOR DISCRETE-TIME CIRCUITS

(71) Applicant: Analog Devices, Inc., Wilmington, MA (US)

(72) Inventors: Huseyin Dinc, Chapel Hill, NC (US); Ahmed Mohamed Abdelatty Ali, Oak Ridge, NC (US)

(73) Assignee: Analog Devices, Inc., Wilmington, MA (US)

( * ) Notice: Subject to any disclaimer, the term of this patent is extended or adjusted under 35 U.S.C. 154(b) by 240 days.

(21) Appl. No.: 18/322,052

(22) Filed: May 23, 2023

(65) Prior Publication Data

US 2024/0396702 A1 Nov. 28, 2024

(51) Int. Cl.
*H04L 7/00* (2006.01)

(52) U.S. Cl.
CPC ................................ *H04L 7/0033* (2013.01)

(58) Field of Classification Search
CPC ...................................................... H04L 7/033
See application file for complete search history.

(56) References Cited

U.S. PATENT DOCUMENTS

2010/0239058 A1\* 9/2010 Fujita ...................... H03L 7/087
375/371
2019/0131992 A1\* 5/2019 Ali ....................... H03M 1/1004

\* cited by examiner

*Primary Examiner* — Rahel Guarino
(74) *Attorney, Agent, or Firm* — ArentFox Schiff LLP

(57) ABSTRACT

Aspects of the present disclosure include methods for operating discrete time circuits. A method in accordance with an aspect of the present disclosure may comprise sampling a first amplitude of a signal at a first time, sampling a second amplitude of the signal at a second time, comparing the first amplitude to the second amplitude, and adjusting a sampling time of the signal based at least in part on a difference between the first amplitude and the second amplitude.

19 Claims, 9 Drawing Sheets

TIMING CALIBRATION TECHNIQUES FOR DISCRETE-TIME CIRCUITS

BACKGROUND

Technical Field

The present disclosure generally relates to calibration techniques, and more particularly, to timing calibration techniques in discrete-time circuits.

INTRODUCTION

As the sample rates of converters are increased, circuits with incomplete settling parameters may be used to reduce power consumption and still achieve the desired high sample rates. The incomplete settling of these circuits results in gain error and other non-ideal conditions for the converters and discrete time circuits in general.

In some converters, gain error may be corrected in the digital domain using dither-based calibration techniques. These techniques may detect the actual gain of the circuits in the analog domain and apply the appropriate digital correction that corresponds to that gain. Gain error correction is done on inter-stage gain amplifiers of pipelined analog-to-digital (ADC) converters to correct for inter-stage gain errors. Such corrections may also be done at the output of a track-and-hold (T/H) or buffer circuit to multiple sub-ADCs to correct for gain mismatch.

Although these techniques may correct for gain error and non-linearity, these techniques do not correct for other effects that may be caused by the incomplete settling. Further, the sampling point may not be at the optimum point of the output waveform of the amplifier or the input waveform to a sampler in general.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

A method for operating a discrete time circuit in accordance with an aspect of the present disclosure may comprise sampling a first amplitude of a signal at a first time, sampling a second amplitude of the signal at a second time, comparing the first amplitude to the second amplitude, and adjusting a sampling time of the signal based at least in part on a difference between the first amplitude and the second amplitude.

Such a method further optionally includes delaying/advancing the sampling time or delaying/advancing the signal, at least one of delaying the sampling time and delaying the signal comprising a random amount of delay, adjusting the sampling time being based at least in part on satisfying a condition of the discrete time circuit, the condition comprising at least one of a signal-to-noise ratio (SNR), a distortion, a gain, or a spurious response, adjusting the sampling time of the signal comprising delaying the sampling time of the signal when the difference between the first amplitude and the second amplitude is negative or positive, and adjusting the sampling time of the signal comprising maintaining the sampling time of the signal when the difference between the first amplitude and the second amplitude is less than a threshold value.

Such a method further optionally includes adding a dither term to the sampling time, a value of the dither term maintaining a convergence of the adjusting of the sampling time, sampling the signal at the first time a consecutive first plurality of times to obtain a plurality of first amplitudes, sampling the signal at the second time a consecutive second plurality of times to obtain a plurality of second amplitudes, comparing a first estimate of the gain obtained from the plurality of first amplitudes to a second estimate of the gain obtained from the plurality of second amplitudes, and adjusting the sampling time of the signal further comprises adjusting based at least in part on a difference between the first estimate obtained from the plurality of first amplitudes and the second estimate obtained from the plurality of second amplitudes.

A device in accordance with an aspect of the present disclosure may include a sampling block, a variable delay clock, coupled to the sampling block, a gain estimator, coupled to the sampling block; and a delay block, coupled to the gain estimator, wherein an amount of delay of at least one of the delay block and the variable delay clock is based at least in part on a difference in amplitude of a signal sampled in the sampling block at at least two different times.

Such a device may further optionally include the amount of delay being applied to an input signal, the amount of delay being a random amount of delay, the amount of delay being based at least in part on satisfying a condition of the discrete time circuit, the condition comprising at least one of a signal-to-noise ratio (SNR), a distortion, a gain, or a spurious response, the amount of delay being altered by addition of a dither term, a value of the dither term maintaining a convergence of the sampling time, and the difference in amplitude of the signal sampled in the sampling block comprising a difference of an estimate of the amplitude of the signal sampled at at least two different times.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Aspects of the present disclosure allow for the gain of an amplifier in a discrete time circuit to be sampled at a desired point throughout the life of the circuit. Aspects of the present disclosure also allow for the desired point to be selected based on amplitude, signal-to-noise ratio, or other parameters, and allow for the sampling point to be dynamically selected and/or moved depending on process, voltage, and temperature parameters.

Overview

Figure 1A:
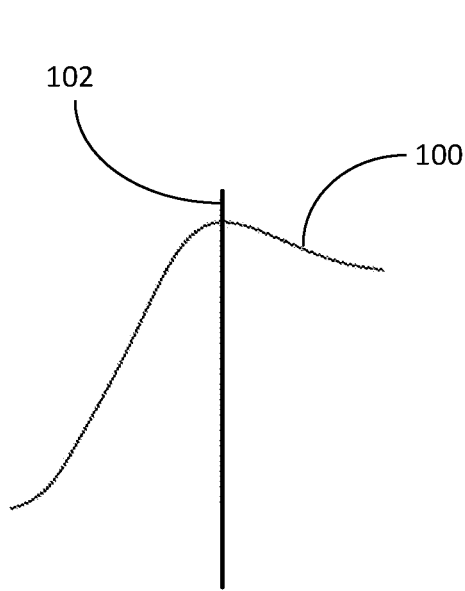
FIGS. 1A and 1B are graphs of a settling pattern of a sampling instant in accordance with an exemplary aspect of the present disclosure.
Figure 1B:
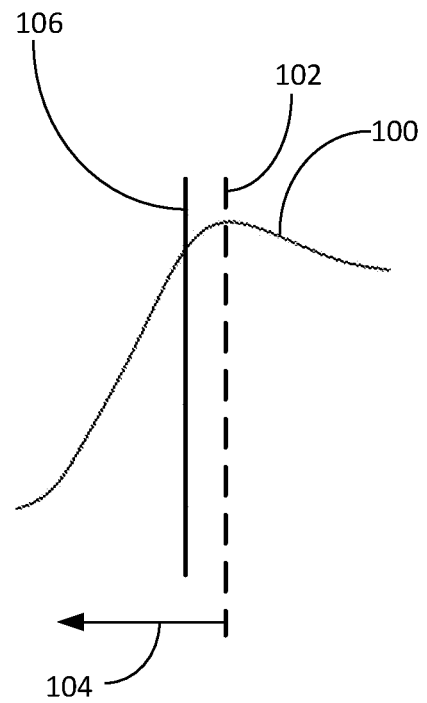

FIGS. 1A and 1B illustrate a settling pattern and the sampling instant in accordance with an exemplary aspect of the present disclosure.

FIG. 1A illustrates an example of an output signal 100 of an amplifier in a discrete time circuit, with a sampling instant 102 of the output signal 100 at a given point of a curve of the output signal 100. Amplitude of the output signal 100 is on the y axis and time is on the x axis in FIG. 1A. Sampling instant 102 is shown at or near a peak of the output signal 100, which is a desired or optimal point for sampling of the output signal 100. The slope of the output signal 100 is approximately zero at the desired or optimal sampling point of output signal 100.

However, with changing process, voltage, and temperature (PVT) conditions, the sampling instant 102 in a discrete time circuit may occur before or after the optimum point of output signal 100. Aging of amplifier and clock circuitry may also be a concern in fine geometry processes; such aging of the circuitry may also affect the relative timing of the sampling instant 102 within a given system. With such timing changes, the desired performance may not be maintained at high speeds.

FIG. 1B illustrates movement 104 of sampling instant 102 to sampling instant 106. Amplitude of the output signal 100 is on the y axis and time is on the x axis in FIG. 1B. Movement 104 of sampling instant 102, although shown moving sampling instant 102 to the left, may also move the sampling instant 102 to the right without departing from the scope of the present disclosure.

Movement 104 from sampling instant 102 to sampling instant 106 may be caused by one or more conditions within the circuitry, e.g., PVT, aging, etc., of the discrete time circuit as described above. As seen in FIG. 1B, sampling instant 106 now occurs at a point or region of output signal 100 where the output signal 100 of the discrete time circuit has a larger slope than at sampling instant 102. Although some of the effects of movement 104 can be corrected in the digital domain, e.g., gain error, etc., other effects of movement 104 are not necessarily corrected, e.g., clock jitter, etc. These effects may degrade the signal-to-noise ratio (SNR) of the circuitry. Sampling at a high slope region of the output signal 100, in conjunction with a shorter settling time of the circuitry, may also increase the overall sensitivity of the converter to PVT variations, which will degrade consistency and the effectiveness of calibrations of the overall system.

Good layout practices, and component matching may be used to reduce the amount of movement 104. However, these may only have limited success, because of the different locations and different data/clock processing employed in the different paths, e.g., path lengths, number of inverters employed to achieve certain drive strength, etc. In addition, the location of the sampling instant 106 relative to the output signal 100 also depends on the propagation delay of the input signal in the amplifier, matching the amplifier delay, amplifier network clocking, and receiving sampling network clocking across multiple ADCs, temperature, supply, process, and duty cycle variability to be within 1-2 picoseconds (ps), consistently over the lifecycle of a given amplifier, is difficult. Additionally, there is a statistical variation of the different circuit paths, which may also add about 2 ps of variation.

To account for all these variables, margins in the order of 5-10 ps may be used to ensure reasonable performance. At high sample rates, e.g., 20 gigasamples/second, when taking the available settling time into account, a 30% degradation in sample rate and/or ~10 dB degradation in noise/spur performance is likely. These degradations are unacceptable and they would increase at even higher sample rates.

In an aspect of the present disclosure, techniques are presented that calibrate the sampling instant 102 to be in a desired or "optimum" location and still account for PVT changes and aging. In an aspect of the present disclosure, such techniques may also help correct for gain error and other non-idealities. These techniques may enable the timing calibration of discrete-time sampling circuits, where amplifiers with inadequate settling are used. Such techniques may also allow for increased sampling rates, and may also reduce power consumption of such circuitry.

For a discrete-time signal, errors caused by timing shifts are not orthogonal to the gain error. For systems with random inputs or with dither injected on the input, signals are expected to be well-behaved with respect to time. Since timing errors result in gain errors, timing changes cause gain changes. Although an exact gain estimate may have inconsistencies due to poor settling, an approximate relation between the gain and settling time may be captured with adequate accuracy in the gain estimate. As such, reduction of the time errors can be approached as a gain maximization problem. By formulating the problem as a gain maximization or gain error minimization problem, the timing can be adjusted.

Gain Maximization/Sample Timing Delay

Figure 2:
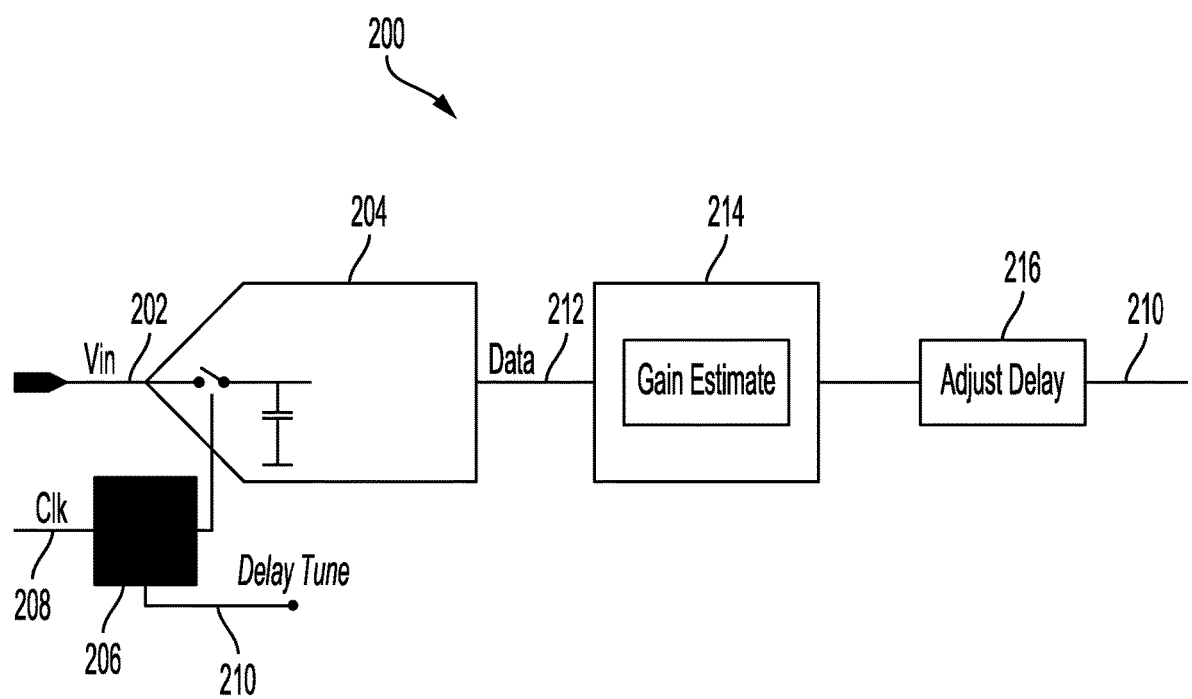
FIG. 2 is a block diagram in accordance with an exemplary aspect of the present disclosure.

FIG. 2 illustrates a block diagram in accordance with an exemplary aspect of the present disclosure.

Diagram 200 illustrates a device receiving a signal 202 (Vin) as an input to a sampling block 204. Sampling block 204 is coupled to a variable delay clock 206, which receives a clock signal 208 input and a delay input 210.

Data 212 is an output of sampling block 204, and is used as an input to a gain estimator 214. The gain estimate output of gain estimator 214 is coupled to a delay block 216. Delay block 216 produces delay input 210 which is used as an input to variable delay clock 206.

Delay block 216 allows for sampling of an amplifier at a variable delay, where the delay block 216 moves the sampling time (instant) based on a difference in amplitude at different sampling times.

The following algorithm can be used to control the timing delay from delay block 216 such that the gain is maximized:

$$t(i+1) = t(i) + \mu \cdot \underbrace{[G(i) - G(i-1)] \cdot [t(i) - t(i-1) + D_d(i)]}_{\text{has sign of slope}}$$

Where t is the sampling time (delay adjustment to the sampling time), G is the gain estimate, and $D_d$ is an optional digital dither added in the digital domain to prevent the algorithm from getting "stuck" in a false maximum. Alternatively, the update steps can be taken uniformly in the direction of ascent:

$$\Delta G = G(i) - G(i-1)$$
$$\Delta T = t(i) - t(i-1) + D_d(i)$$
$$\text{update\_dir} = \text{sign}(\Delta G \times \Delta T)$$
$$t(i+1) = t(i) + \mu \times \text{update\_dir}$$

Additionally, the update steps can be scaled either by the change in gain ($\Delta G$) or time ($\Delta T$):

$$t(i+1) = t(i) + \mu \times \text{abs}(\Delta G) \times \text{update\_dir},$$
$$t(i+1) = t(i) + \mu \times \text{abs}(\Delta T) \times \text{update\_dir}.$$

To prevent the algorithm from getting stuck after convergence, digital dithering $D_d$ can be added to the algorithm if desired. This additional dithering term may be applied, but is not necessarily applied, to any time adjustment applied in the analog domain.

If a dithering term is applied to the time adjustment from delay clock 206, the dithering term can be made small enough based on the slope of the sampled signal and desired performance so as to maintain the sampling instant of signal 202 in the desired region and/or to have negligible effect on the performance when the sampling instant is in a desirable location.

In an aspect of the present disclosure, variations of these equations may be used to maximize a desired quantity or minimize an error. Adjustment of the delay can be in the direction of higher gain, or can be made to satisfy another desirable condition, e.g., maximize the signal-to-noise ratio (SNR), minimize distortion, minimize spurious response, and/or other conditions. Each desired condition may adjust the direction of the delay in a different direction, and may correspond to different algorithms than shown above, without departing from the scope of the present disclosure.

The gain estimate from gain estimator 214 can be obtained by using dither-based (correlation-based) techniques or by using power estimates (or absolute value estimates) of the input signal, or any other approach. Other variations of this algorithm can also be used, where G does not necessarily represent the gain, but some other parameter that needs to be maximized such as SNR or minimized such as spur level or distortion.

Timing Calibration with Random Timing Perturbation

FIGS. 3A through 3D illustrate a method of sampling a signal in accordance with an exemplary aspect of the present disclosure. Amplitude of the signal is on the y axis and time is on the x axis in FIGS. 3A-3D.

In an aspect of the present disclosure, the change in sampling instant 106 may be done over a number of samples of the signal 100. Further, the amplitude of signal 100, or any other desired parameter, may be compared at two different sampling instants over a large number of samples of signal 100.

Based on the results of comparisons over a large number of samples, the sampling instant of signal 100 can be moved to a desired point, e.g., the approximate maximum amplitude of signal 100, the approximate maximum signal to noise ratio, etc. For example, if the sampling instant is desired at or near the peak of the settling profile (step response) of signal 100, the delay (e.g., delay clock 206, or a delay in the signal 100 itself) can be adjusted until the signal sampled at two different times over the large number of samples have roughly the same amplitude estimates.

Figure 3A:
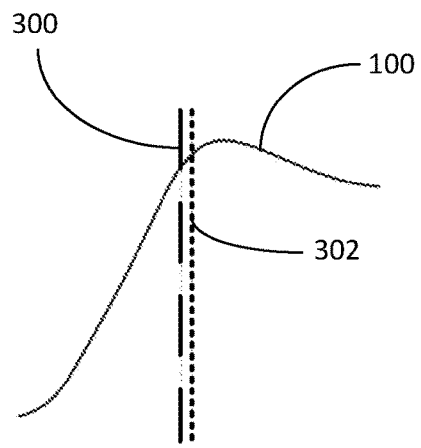
FIGS. 3A through 3D are graphs of a method of sampling a signal in accordance with an exemplary aspect of the present disclosure.

FIG. 3A illustrates a first sampling instant 300 at time t and a second sampling instant at time t+Δt. In an aspect of the present disclosure, signal 100 is sampled at either at sampling instant 300 or sampling instant 302. The sampling instant for a given signal 100 is alternated between sampling instant 300 and sampling instant 302. The alternating of sampling instants 300 and 302 may be randomly alternated if desired. The gain for sampling instant 300 and sampling instant 302 is estimated after collecting a desired number of samples at sampling instant 300 and at sampling instant 302. Using these gain estimates at sampling instant 300 and sampling instant 302, a slope of the gain is determined, which allows for the calibration for where signal 100 is to be sampled by moving delay clock 206 and/or signal 100 with respect to sampling instant 300 and sampling instant 302.

Figure 3B:
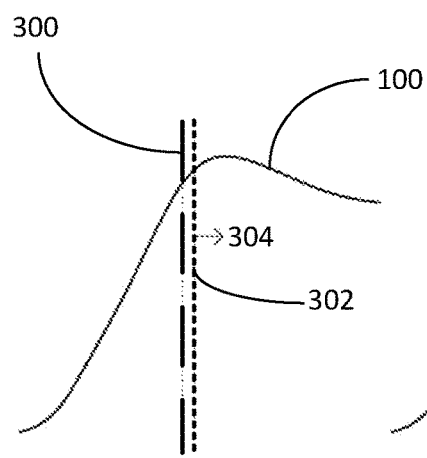

FIG. 3B illustrates first sampling instant 300 and second sampling instant 302, where the amplitude of signal 100 at second sampling instant 302 is higher than the amplitude of signal 100 at first sampling instant 300. In such an example, the slope of the amplitude of signal 100 is positive, e.g. has a value greater than zero. When the slope of the amplitude of signal 100 is positive, in an aspect of the present disclosure the delay of the sampling instant can be moved in direction 304, e.g., a longer delay of the sampling instant or a shorter delay of signal 100 (e.g., the signal 100 needs to be advanced relative to the delay clock 206 in this case). In such an aspect, the sampling time is said to be "delayed" in time.

Figure 3C:
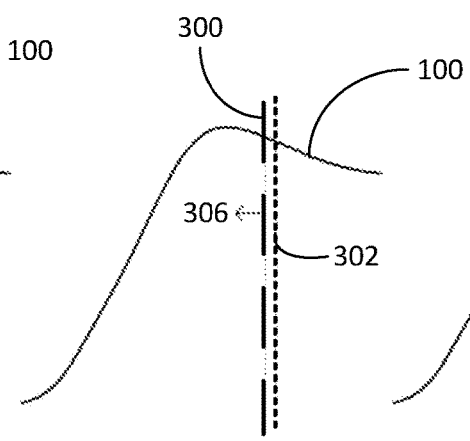

FIG. 3C illustrates first sampling instant 300 and second sampling instant 302, where the amplitude of signal 100 at second sampling instant 302 is lower than the amplitude of signal 100 at first sampling instant 300. In such an example, the slope of the amplitude of signal 100 is negative, e.g. has a value less than zero. When the slope of the amplitude of signal 100 is negative, in an aspect of the present disclosure the delay of the sampling instant can be moved in direction 306, e.g., a shorter delay of the sampling instant or a longer delay of signal 100. In such an aspect, the sampling time is said to be "advanced" in time.

Figure 3D:
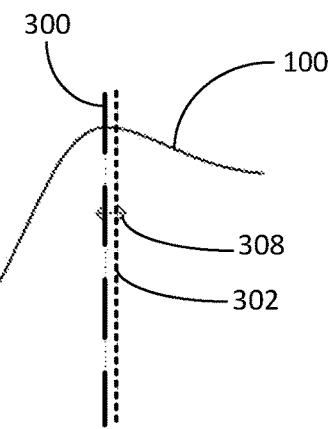

FIG. 3D illustrates first sampling instant 300 and second sampling instant 302, where the amplitude of signal 100 at second sampling instant 302 is approximately equal to the amplitude of signal 100 at first sampling instant 300. In such an example, the slope of the amplitude of signal 100 is approximately equal to zero. When the slope of the amplitude of signal 100 is approximately zero, or within a desired tolerance or threshold depending on the slope of the sampled signal and the desired performance. In an aspect of the present disclosure the delay of the sampling instant can be left alone, as the desired sampling instant has been found. As such, the movement of sampling instant may be in direction 308, e.g., a minimal change of the sampling instant may be used, if any change at all is desired.

In an aspect of the present disclosure, the signal 100 is sampled at various instances, e.g., first sampling instant 300 and second sampling instant 302 as shown in FIG. 3A, and depending on the slope of the amplitude (or other desired parameter) the sampling instants are advanced or delayed as shown in FIGS. 3B and 3C until a quiescent point of the slope, or some plateau of the desired parameter, or some threshold value is reached as shown in FIG. 3D. The sampling point of signal 100 is then used as determined through the iterative process, as the circuitry that produces signal 100 ages, temperature changes, etc., the sampling point of signal 100 can be moved in an aspect of the present disclosure.

In an aspect of the present disclosure, a large number of samples, e.g., a large number of first sampling instants 300 and second sampling instants 302 of signal 100 over time can be averaged together before moving the sampling point(s) of signal 100. So, for example, and not by way of limitation, ten to one hundred thousand first sampling instants 300 and second sampling instants 302 can be taken, averaged, and these average values used to determine the slope of signal 100 prior to moving the sampling points of signal 100, where the number of samples collected at sampling instant 300 and 302 can be roughly the same, If the gain estimate of the first sampling instant 300 and second sampling instant 302 are within a desired tolerance or indicate a zero slope of signal 100, then the quiescent point of FIG. 3D has been reached.

In an aspect of the present disclosure, any desired sampling point of signal 100 (or signal 202) can be reached by determining the desired slope between first sampling instant 300 and second sampling instant 302, determining a normalized offset between the peaks of two sampling instants, or determining the distance in time between the plateau of signal 100 and the desired sampling point. Many possibilities of sampling instants are possible given the scope of the present disclosure. In an aspect of the present disclosure, an offset may be added to the gain estimate block 214 such that the sampling instant converges to the slope corresponding to the added offset value.

In an aspect of the present disclosure, signal 402 may be sampled at two different points by changing the sample time from one sample to other or the timing of the signal 402 relative to the clock signal 408 from sample to sample. Similarly, the correction in timing can be applied as a delay correction to the delay block 406 or the input signal 402. The signal 402 may be sampled at two different points by changing the sample time from one sample to other or the timing of the signal 402 relative to the clock signal 408 slowly not necessarily sample to sample. For example, the sampling instant can be changed from 300 to 302 randomly. This random selection can be updated at a fraction of the sampling frequency.

Figure 4:
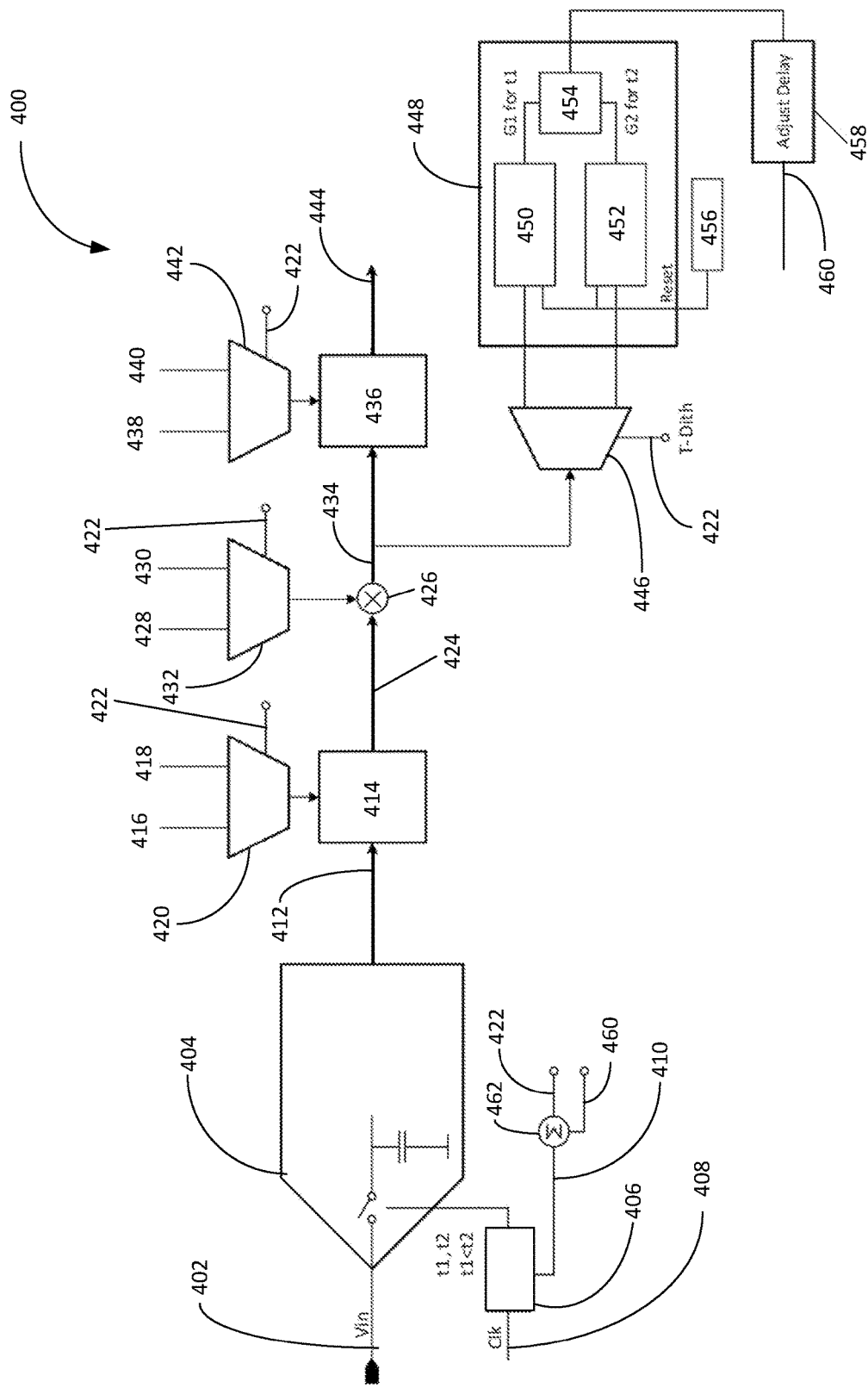
FIG. 4 is a block diagram of a timing calibration circuit in accordance with an exemplary aspect of the present disclosure.

FIG. 4 illustrates a block diagram of a timing calibration circuit in accordance with an exemplary aspect of the present disclosure.

FIG. 4 illustrates system 400, showing signal 402 (Vin) as an input to a sampling block 404. Sampling block 404 is coupled to a variable delay clock 406, which receives a clock signal 408 input and a delay signal 410.

Data 412 is an output of sampling block 404, and is used as an input to a pre-gain calibrator 414. Pre-gain calibrator 414 also receives pre-gain coefficients 416 for sample time t1 and pre-gain coefficients 418 for sample time t2 from circuitry 420. Circuitry 420 may also receive dither input 422.

Pre-gain calibrator 414 outputs signal 424 to gain (multiply) block 426, which also receives the gain 428 at sample time t1 and gain 430 at sample time t2 from circuitry 432. Circuitry 432 may also receive dither input 422.

The output 434 the summing block 426 is provided as an input to post-gain calibrator 436, which also receives post-gain coefficients 438 for sample time t1 and post-gain coefficients 440 for sample time t2 from circuitry 442. Post-gain calibrator 436 provides output 444 from the system 400 to be used as the gain estimate for a given system.

Output 434 is also provided to circuitry 446, which provides the gain 428 and 430 of the signal 402 to gain estimator 448. Within gain estimator 448, the gain estimate G1 for time t1 is done in circuitry 450, and the gain estimate G2 for time t2 is done in circuitry 452. In an aspect of the present disclosure, these gain estimates G1 and G2 may be done in consecutive samples. This can be done for slowly changing signals. For signals whose amplitude changes from sample to sample, A large number of samples may be taken at sampling instant 300 and sampling instant 302 to be able to estimate the gains at these two sampling instants accurately or may be averaged over a number of samples as desired. The gain estimate for sampling time t1 is G1, and the gain estimate for t2 is G2. G1 is compared to G2 in comparator 454. If the embodiment is an averaging embodiment, where a large number of samples are taken before comparison, a counter 456 may be used to count the number of samples and/or to reset the comparison being performed in gain estimator 448.

The output of the comparator 454 is provided to delay block 458, which can further average/filter this output and adjusts the delay of signal 402 and/or the delay of the sampling instant of signal 402 as discussed with respect to FIGS. 3A-3D. Delay block 458 produces delay input 460, which is used as an input to summing block 462.

Summing block 462 receives delay input 460 and dither input 422 and sums these signals together to provide a delay signal 410 to variable delay clock 406. This feedback of delay signal 410 then changes the sampling instant of signal 402 as described with respect to FIGS. 3A-3D.

In an aspect of the present disclosure, the clock signal 408 can be altered or "perturbed," e.g., delayed or advanced, to desensitize the system 400 from input conditions, through dither input 422.

Since the signal 402 cannot be sampled at t1 and t2 (i.e., sampling instant 300 and sampling instant 302) in the same signal, statistical methods over a large number of samples may be used. In an aspect of the present disclosure, the sampling instants may be randomly changed between two points from sample to sample or at a speed which can be a fraction of the sampling speed. The maximum peak-to-peak values of the large number of samples at the sampling points can be compared, or just from the sign of the comparison of the points, an error signal (delay input 460) can be generated, which is then used to adjust the delay of the variable delay clock 406. Although it is possible to move only one of the sampling instants, in an aspect of the present disclosure, both sampling instances (i.e., sampling instant 300 and sampling instant 302) can be moved simultaneously by the delay input 460. The timing difference between sampling instant 300 and sampling instant 302 may be maintained by summing block 462 while adjusting the delays. Summing block 462 moves the clock by a dither input 422 which randomly moves the sampling instant from sampling instant 300 to sampling instant 302, and delay input 460 moves sampling instant 300 and sampling instant 302 together to the desired point.

In an aspect of the present disclosure, the coefficients 416, 418, 428, 430, 438, and 440 can be used anywhere in system 400, and the methodology described for system 400 can be used at the output of a sample-and-hold or track-and-hold system or in any stage of such systems. The approaches described in the present disclosure can be applied to any dynamic amplifier behavior where incomplete settling makes it desirable to control the sampling instant. Further, the approaches described in the present disclosure can be applied whether the amplifier settling behavior is under-damped, over-damped, or integrator-like. In severely under-damped cases, such approaches may be adjusted to handle multiple peaks and designed to converge to the appropriate peak of the signal 402 as desired, e.g., largest peak, peak with longest settling time, maximum SNDR, etc. In an aspect of the present disclosure, the sampling instant shifting approaches can be used to achieve a certain desired gain value, instead of maximizing the gain as described above.

In an aspect of the present disclosure, an addition may be added onto the signal 402 to dither the signal 402. In situations where there are no external inputs to system 400, an additional input, which may be a dithered input, can act as signal 402 (i.e., an input) to system 400. In such aspects, the calibration of the sampling instant 300 and sampling instant 302 can be performed by such an additional input to system 400. As such, calibration methods presented as part of the present disclosure may operate even in the absence of external inputs to system 400. Further, instead of controlling the timing of the variable delay clock 406, the algorithm can be used to control the timing of a clock, a track-and-hold, or a stage of a track-and-hold system, and/or some parameter of the amplifier that controls its delay, reset time, etc.

When a random timing perturbation is injected into the clock signal 408, the frequency of the random timing perturbation can be slow to avoid the effects of fast changes in timing and hardware changes.

Figure 5:
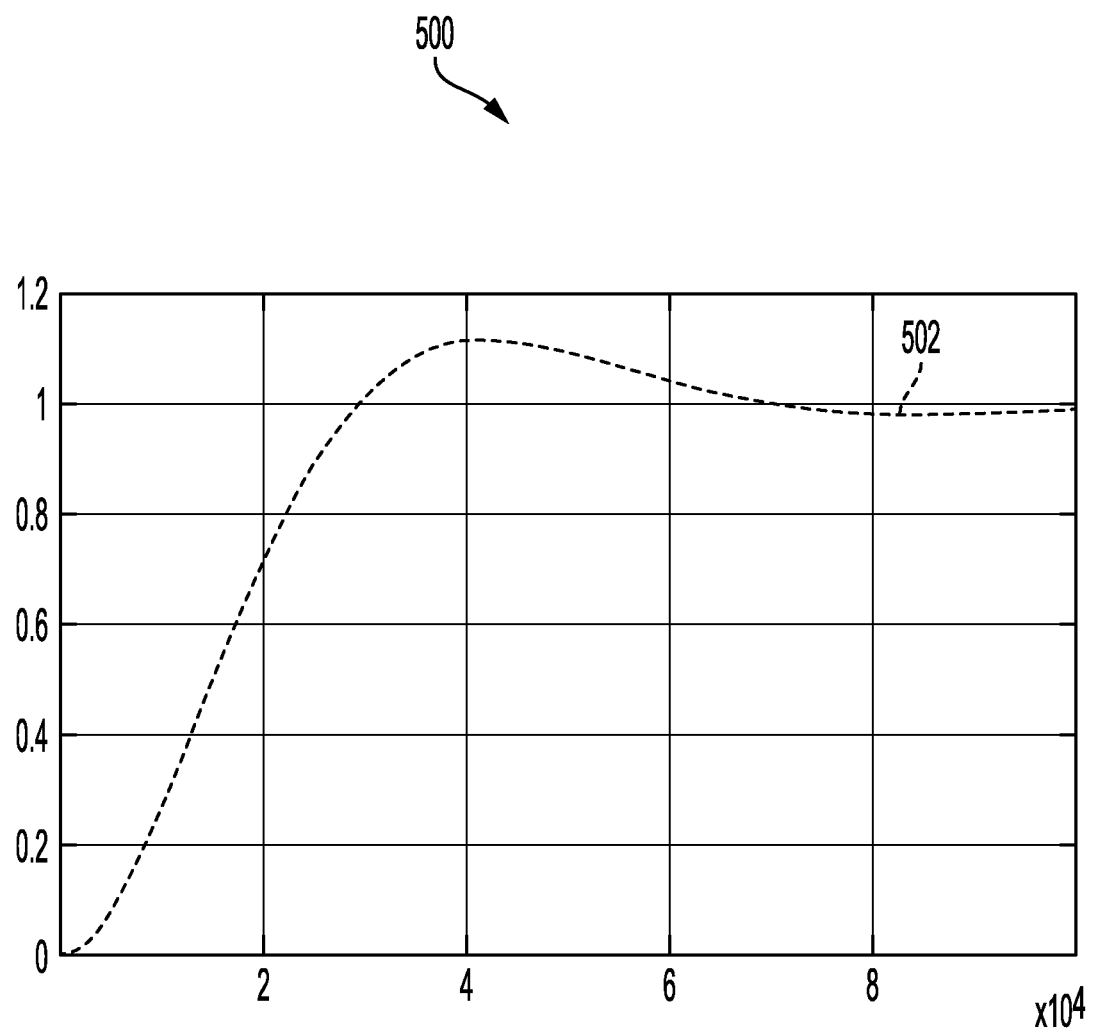
FIG. 5 is a graph of a settling profile of an input signal in accordance with an exemplary aspect of the present disclosure.

FIG. 5 illustrates a settling profile of an input signal in accordance with an exemplary aspect of the present disclosure.

Graph 500 illustrates signal 502, which is a plot of a settling behavior of an amplifier over time, where the amplitude is on the y axis and time is on the x axis.

Figure 6:
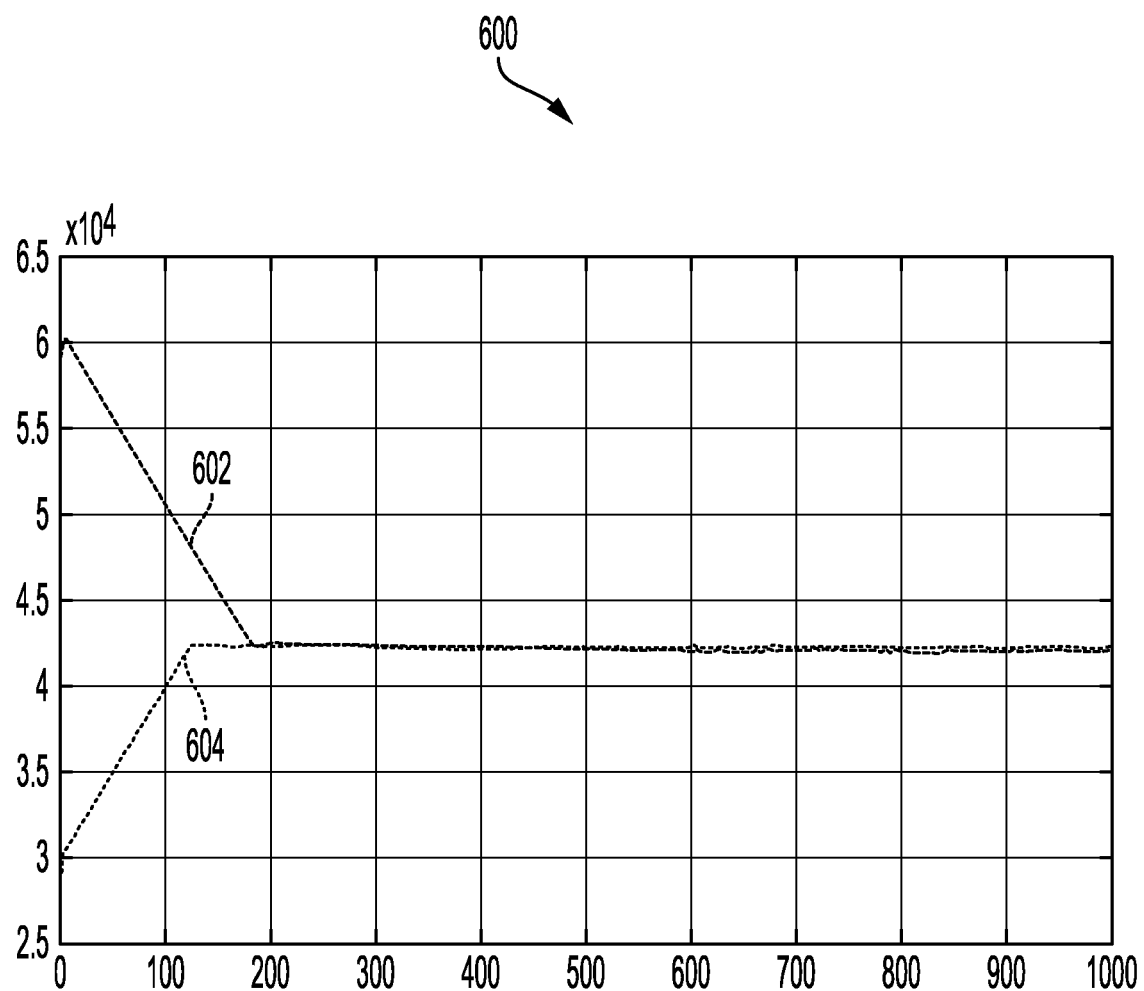
FIG. 6 is a graph of a sampling instant moving toward a peak of an input signal in accordance with an exemplary aspect of the present disclosure.

FIG. 6 illustrates a graph of the sampling instant moving toward a peak of the input signal in accordance with an exemplary aspect of the present disclosure.

Graph 600 shows line 602 and line 604, which start out as divergent values and arrive at a similar value of the sampling instant. Delay of the signals is shown on the y axis and time is on the x axis in FIG. 6. Line 602 shows a negative slope of convergence, similar to that discussed with respect to FIG. 3D, while line 604 shows a positive slope of convergence, similar to that discussed with respect to FIG. 3C.

Figure 7:
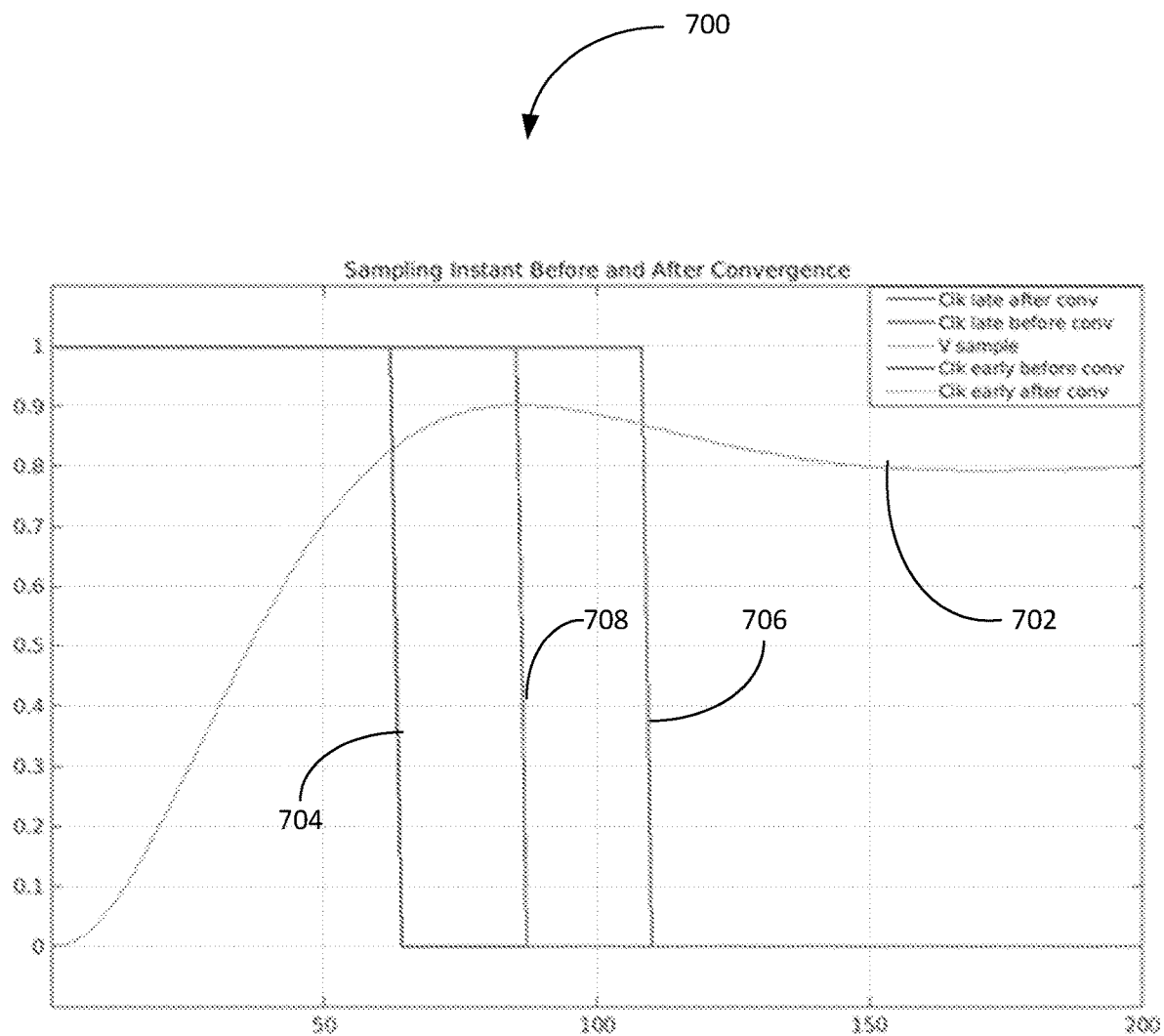
FIG. 7 is a graph of clock signals that are delayed or advanced with respect to an input signal in accordance with an exemplary aspect of the present disclosure.

FIG. 7 illustrates clock signals that are delayed or advanced with respect to the input signal in accordance with an exemplary aspect of the present disclosure.

Graph 700 illustrates signal 702, which is a plot of a settling behavior of an amplifier over time, where the amplitude is on the y axis and time is on the x axis. Signal 704 shows an "early" clock, i.e., a clock signal that samples signal 702 before the peak of signal 702. Signal 706 shows a "late" clock, i.e., a clock signal that samples signal 702 after the peak of signal 702. Delay of the signals 704 and 706 is shown on the y axis and time is on the x axis in FIG. 7.

Signal 708 shows the convergence of signal 704 and signal 706 after the features of the present disclosure are applied to signal 704, signal 706, and/or the signal 702. Signal 708 shows that the clock signal has shifted with respect to signal 702, and now samples signal 702 at the peak amplitude.

Figure 8:
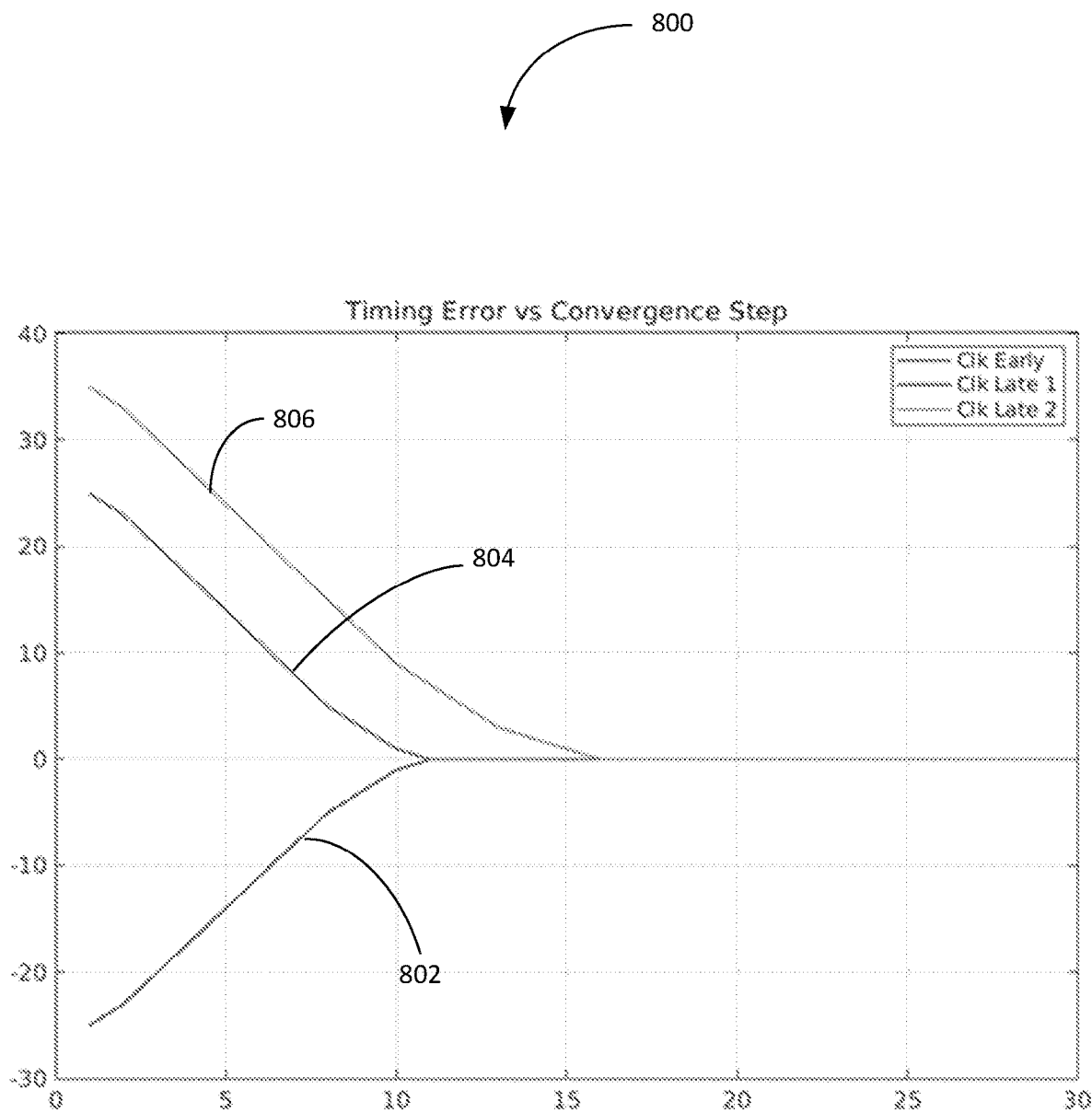
FIG. 8 is a graph of a convergence of a timing error for clock signals that are delayed or advanced with respect to an input signal in accordance with an exemplary aspect of the present disclosure.

FIG. 8 illustrates convergence of the timing error for clock signals that are delayed or advanced with respect to the input signal in accordance with an exemplary aspect of the present disclosure. Delay of the signals is shown on the y axis and time is on the x axis in FIG. 8.

Graph 800 shows line 802, which is a graph of convergence of an early clock signal, line 804, which is a graph of convergence of a late clock signal, and line 806, which is a graph of convergence of a late clock signal that is further delayed with respect to the clock signal used in line 804. Line 802, line 804, and line 806 start out as divergent values and arrive at a similar value of the sampling instant. Line 802 shows a positive slope of convergence, similar to that discussed with respect to FIG. 3C, while line 804 and line 806 show a negative slope of convergence, similar to that discussed with respect to FIG. 3D.

Figure 9:
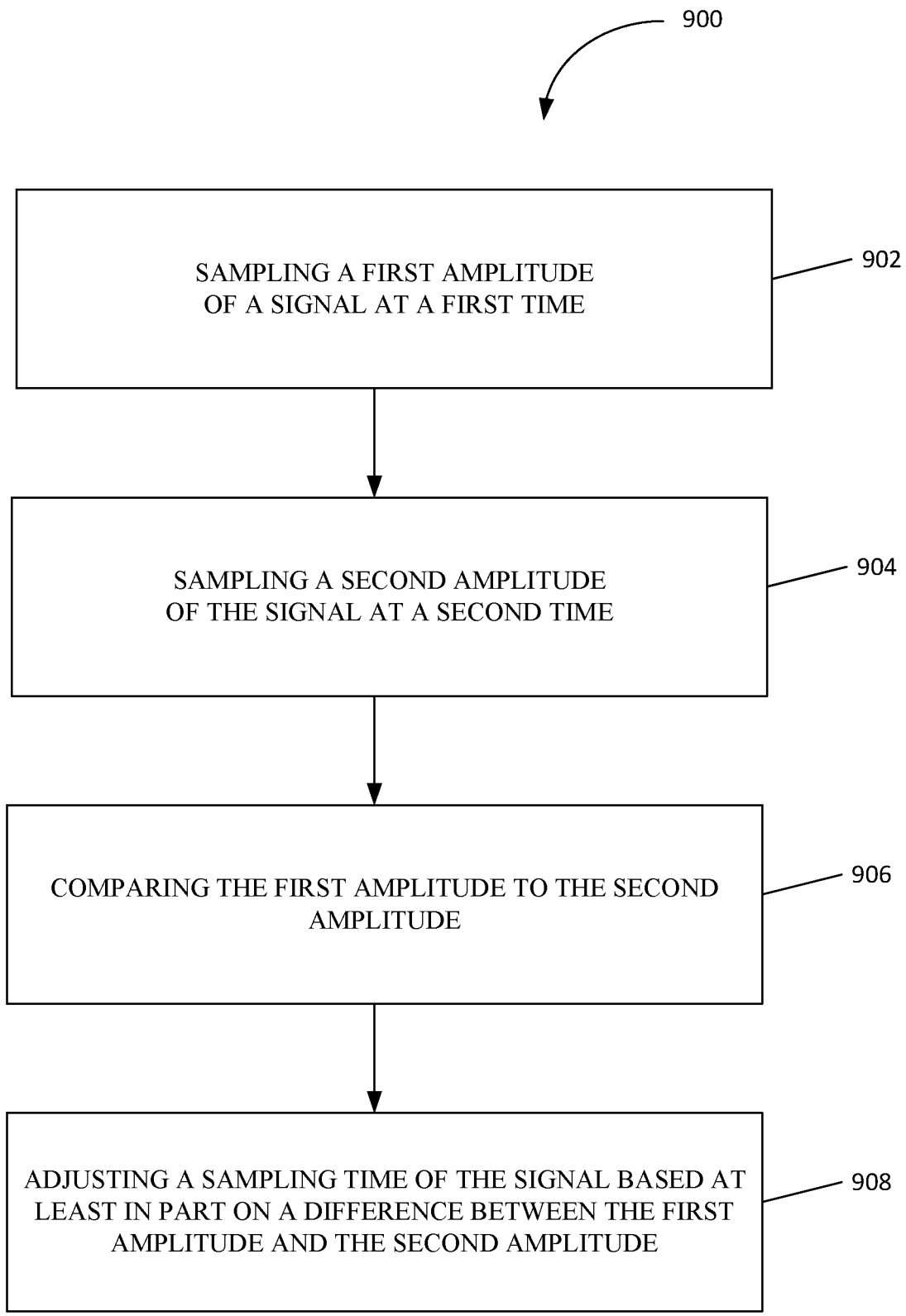
FIG. 9 is a flow diagram in accordance with an exemplary aspect of the present disclosure.

FIG. 9 illustrates a flow diagram in accordance with an exemplary aspect of the present disclosure.

Chart 900 illustrates block 902, 904, 906, and 908.

Block 902 represents sampling a first amplitude of a signal at a first time. Block 902 may be performed by sampling block 204 as described with respect to FIG. 2.

Block 904 represents sampling a second amplitude of the signal at a second time. Block 904 may be performed by sampling block 204 as described with respect to FIG. 2.

Block 906 represents comparing the first amplitude to the second amplitude. Block 906 may be performed by gain estimator 214 as described with respect to FIG. 2.

Block 908 represents adjusting a sampling time of the signal based at least in part on a difference between the first amplitude and the second amplitude. Block 908 may be performed by variable delay clock 206 as described with respect to FIG. 2.

The previous description is provided to enable any person skilled in the art to practice the various aspects described herein. Various modifications to the exemplary aspects and aspects presented throughout this disclosure will be readily apparent to those skilled in the art, and the concepts disclosed herein may be applied in other contexts and for different purposes. Thus, the claims are not intended to be limited to the exemplary aspects presented throughout the disclosure, but are to be accorded the full scope consistent with the language claims. All structural and functional equivalents to the elements of the exemplary aspects described throughout this disclosure that are known or later come to be known to those of ordinary skill in the art are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f), or analogous law in applicable jurisdictions, unless the element is expressly recited using the phrase "means for" or, in the case of a method claim, the element is recited using the phrase "step for."

What is claimed is:

1. A method for operating a discrete time circuit, comprising:
   sampling a first amplitude of a signal at a first time;
   sampling a second amplitude of the signal at a second time;
   comparing the first amplitude to the second amplitude; and
   adjusting a sampling time of the signal based at least in part on a difference between the first amplitude and the second amplitude;
   wherein adjusting the sampling time of the signal comprises delaying the sampling time of the signal when the difference between the first amplitude and the second amplitude is negative.

2. The method of claim 1, wherein adjusting the sampling time of the signal further comprises at least one of:
   delaying the sampling time or delaying the signal.

3. The method of claim 2, wherein at least one of delaying the sampling time and delaying the signal comprises a random amount of delay.

4. The method of claim 1, wherein adjusting the sampling time of the signal further comprises at least one of:
   advancing the sampling time or advancing the signal.

5. The method of claim 1, wherein adjusting the sampling time is based at least in part on satisfying a condition of the discrete time circuit.

6. The method of claim 5, wherein the condition comprises at least one of a signal-to-noise ratio (SNR), a distortion, a gain, or a spurious response.

7. The method of claim 1, wherein adjusting the sampling time of the signal comprises advancing the sampling time of the signal when the difference between the first amplitude and the second amplitude is positive.

8. The method of claim 1, wherein adjusting the sampling time of the signal comprises maintaining the sampling time of the signal when the difference between the first amplitude and the second amplitude is less than a threshold value.

9. The method of claim 1, further comprising:
   adding a dither term to the sampling time.

10. The method of claim 9, wherein a value of the dither term maintains a convergence of the adjusting of the sampling time.

11. The method of claim 1, further comprising:
    sampling the signal at the first time a consecutive first plurality of times to obtain a plurality of first amplitudes;
    sampling the signal at the second time a consecutive second plurality of times to obtain a plurality of second amplitudes;
    comparing a first estimate of a gain of the signal obtained from the plurality of first amplitudes to a second estimate of the gain of the signal obtained from the plurality of second amplitudes; and
    wherein adjusting the sampling time of the signal further comprises adjusting based at least in part on a difference between the first estimate obtained from the plurality of first amplitudes and the second estimate obtained from the plurality of second amplitudes.

12. A device for operating a discrete time circuit, comprising:
    a sampling block;
    a variable delay clock, coupled to the sampling block;
    a gain estimator, coupled to the sampling block; and
    a delay block, coupled to the gain estimator, wherein an amount of delay of at least one of the delay block and the variable delay clock is based at least in part on a difference in amplitude of a signal sampled in the sampling block at at least two different times;
    wherein the amount of delay is based at least in part on satisfying a condition of the discrete time circuit.

13. The device of claim 12, wherein the amount of delay is applied to an input signal.

14. The device of claim 13, wherein the amount of delay is a random amount of delay.

15. The device of claim 12, wherein the condition comprises at least one of a signal-to-noise ratio (SNR), a distortion, a gain, or a spurious response.

16. The device of claim 12, wherein the amount of delay is altered by addition of a dither term.

17. The device of claim 16, wherein a value of the dither term is used to achieve a sampling instant.

18. The device of claim 12, wherein the difference in amplitude of the signal sampled in the sampling block comprises a difference of an estimate of the amplitude of the signal sampled at at least two different times.

19. A method for operating a discrete time circuit, comprising:
    sampling a first amplitude of a signal at a first time;
    sampling a second amplitude of the signal at a second time;
    comparing the first amplitude to the second amplitude; and
    adjusting a sampling time of the signal based at least in part on a difference between the first amplitude and the second amplitude;
    wherein adjusting the sampling time of the signal further comprises at least one of:
    delaying the sampling time or delaying the signal; and
    wherein at least one of delaying the sampling time and delaying the signal comprises a random amount of delay.

* * * * *